United States Patent
Wang et al.

(10) Patent No.: US 11,953,635 B2
(45) Date of Patent: Apr. 9, 2024

(54) SEISMOMETER WITH HIGH SENSITIVITY, BROADBAND AND ALL-DIP

(71) Applicant: Institute of Geology and Geophysics, Chinese Academy of Sciences, Beijing (CN)

(72) Inventors: Yibo Wang, Beijing (CN); Qingfeng Xue, Beijing (CN); Yikang Zheng, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/352,240

(22) Filed: Jul. 13, 2023

(65) Prior Publication Data
US 2024/0027639 A1   Jan. 25, 2024

(30) Foreign Application Priority Data
Jul. 19, 2022   (CN) .......................... 202210855084.1

(51) Int. Cl.
| | |
|---|---|
| *G01V 1/18* | (2006.01) |
| *G01V 1/00* | (2024.01) |
| *G01V 1/16* | (2006.01) |
| *G01V 1/20* | (2006.01) |
| *G01V 1/30* | (2006.01) |

(52) U.S. Cl.
CPC ................ *G01V 1/18* (2013.01); *G01V 1/003* (2013.01); *G01V 1/164* (2013.01); *G01V 1/202* (2013.01); *G01V 1/307* (2013.01)

(58) Field of Classification Search
CPC .......... G01V 1/18; G01V 1/003; G01V 1/164; G01V 1/202; G01V 1/307
See application file for complete search history.

(56) References Cited

U.S. PATENT DOCUMENTS

| | | | | |
|---|---|---|---|---|
| 4,811,814 A | * | 3/1989 | Staron | ..................... E21B 23/01 181/102 |
| 5,172,345 A | * | 12/1992 | van der Poel | ......... G01V 1/183 367/185 |

(Continued)

FOREIGN PATENT DOCUMENTS

| | | | |
|---|---|---|---|
| CN | 2924555 Y | * | 7/2007 |
| CN | 101089656 A | * | 12/2007 |

(Continued)

*Primary Examiner* — Forrest M Phillips

(57) ABSTRACT

A seismometer with high sensitivity, broadband and all-dip is provided, The which relates to the technical field of seismometer, including a first force feedback module, an insulator, a top cover, a terminal post, an upper leaf spring, a mass block, a casing, a sealing ring, an insulation gasket, a guide spring, a wire frame, a magnetic shoe, a compensation ring, a lower leaf spring, a bottom cover, a second force feedback module and a third force feedback module. It provides the broadband seismometer technology based on dynamic force balance feedback and the all-dip broadband seismometer technology based on dip angle perception, which breaks through the limitations of conventional seismometers in sensitivity, frequency band, and dip angle, and truly realizes a seismometer with high sensitivity, broadband, and all-dip.

9 Claims, 4 Drawing Sheets

(56) References Cited

U.S. PATENT DOCUMENTS

| | | | | | |
|---|---|---|---|---|---|
| 5,469,408 | A | * | 11/1995 | Woo | G01V 1/181 |
| | | | | | 367/182 |
| 6,161,433 | A | * | 12/2000 | Erath | G01V 1/181 |
| | | | | | 73/653 |
| 2006/0042352 | A1 | * | 3/2006 | Kamata | G01V 13/00 |
| | | | | | 73/1.85 |
| 2018/0052243 | A1 | * | 2/2018 | Lau | G01V 1/42 |
| 2023/0296800 | A1 | * | 9/2023 | Zheng | G06N 3/084 |
| | | | | | 702/6 |
| 2023/0324577 | A1 | * | 10/2023 | Wu | G06N 3/09 |
| | | | | | 367/31 |

FOREIGN PATENT DOCUMENTS

| | | | | | |
|---|---|---|---|---|---|
| CN | 204044374 | U | * | 12/2014 | |
| GB | 2318019 | A | * | 4/1998 | F16F 1/324 |

\* cited by examiner

Natural frequency response  Distortion rate response

SEISMOMETER WITH HIGH SENSITIVITY, BROADBAND AND ALL-DIP

TECHNICAL FIELD

The disclosure relates to the technical field of seismometer, in particular to a seismometer with high sensitivity, broadband and all-dip.

BACKGROUND

After the design phase of traditional feedback seismic sensor is completed, the feedback circuit will be statically solidified inside the sensor. When factors such as equipment aging and temperature changes in the working environment cause feedback parameter drift, traditional force feedback seismic sensors cannot dynamically adapt to maintain their rated performance indicators. In order to meet the current monitoring requirements for unconventional and remotely triggered earthquakes, seismometers usually need to be deployed in various complex surface environment areas. Therefore, in order to reduce the construction difficulty, seismometers must be able to adapt to various non-horizontal deployment environments. Existing commercial devices usually only achieve a distortion rate of 0.1% under ±10°, and cannot cope with more inclined environmental conditions. For example, the inclined environmental conditions with ±20° or ±30°, there is an urgent demand for an advanced seismometer device that can still ensure a distortion rate of 0.1% under ±30°.

SUMMARY

In view of the above defects in the prior art, the disclosure provides a seismometer with high sensitivity, broadband and all-dip, which meets high sensitivity, broadband, and all-dip.

In order to achieve the above objective, the technical solution adopted by the present disclosure is shown as below:

A seismometer with high sensitivity, broadband and all-dip provided by the present disclosure, including a first force feedback module, an insulator, a top cover, a terminal post, an upper leaf spring, a mass block, a casing, a sealing ring, an insulation gasket, a guide spring, a wire frame, a magnetic shoe, a compensation ring, a lower leaf spring, a bottom cover, a second force feedback module and a third force feedback module.

The first force feedback module is fixed on the magnetic shoe, the second force feedback module and the third force feedback module are both fixed in a middle of the wire frame, the top cover is tightly pressed on the upper leaf spring and the magnetic shoe, the magnetic shoe is tightly pressed on the lower leaf spring and the bottom cover, the terminal post is elastically connected to the guide spring, the insulator is connected to the casing, the mass block is respectively adjacent to the magnetic shoe and the compensation ring and is located in a middle of the seismometer, the sealing ring is adjacent to the upper leaf spring and is located at a bottom of the seismometer, the insulation gasket is located at a top of the seismometer, and the compensation ring is adjacent to the magnetic shoe.

Further, each of the first force feedback module, second force feedback module and the third force feedback module includes a first control sub module and a second control sub module; the first control sub module includes a coil and a PID feedback circuit; the second control sub module includes an application layer, an algorithm layer connected to the application layer, and a sensing layer connected to the algorithm layer;

the application layer is configured to obtain dynamic orientation and obtain perception of low-frequency signals based on the dynamic orientation;

the algorithm layer is configured to calculate feedback parameters of the seismometer based on the first force feedback module by using a broadband seismometer method based on dynamic force balance feedback, and to cancel interference of gravity components based on the first force feedback module, the second force feedback module and the third force feedback module by using an all-dip broadband seismometer method based on dip angle perception, and feedback angle and attitude information of current seismometer;

the sensing layer is configured to influence a motion of the mass block based on a generated feedback force to obtain a sensing perception result; and the PID feedback circuit is configured to generate feedback current according to the feedback parameters of the seismometer, and generate feedback force based on the coil.

Further, the application layer includes a memory and a collector connected with the memory;

the algorithm layer includes a feedback calculation unit connected to the collector, a D/A converter and a D/A converter respectively connected to the feedback calculation unit; and the sensing layer includes a coil driver connected to the D/A converter, a feedback coil connected to the coil driver, a dynamic coil sensor connected to the feedback coil, and a preamplifier connected to the dynamic coil sensor; and the preamplifier is connected to the A/D converter.

Further, the feedback calculation unit includes:

a parameter estimator, configured to calculate frequency characteristic response of a collected signal and an excitation signal, extract a difference response curve;

a controller parameter calculation sub unit, configured to dynamically adjust calibration parameters of the current seismometer according to a calculated frequency characteristic response curve; and a controller, configured to adjust acquisition frequency according to controller parameters to achieve real-time dynamic calibration of the seismometer.

Further, a calculation process of the feedback parameters of the seismometer is as follows:

A1. the coil driver is used to receive analog signals from the D/A converter, and the feedback coil is controlled through the analog signals to excite a specific frequency vibration signal;

A2. the vibration signal is transmitted to the feedback calculation unit through the dynamic coil sensor, the preamplifier, and the A/D converter in sequence;

A3. the frequency characteristic response of the collected signal and the excited vibration signal is calculated by the feedback calculation unit to extract the difference response curve;

A4. according to the difference response curve, parameters $g'_p$ $g'_i$ $g'_d$ of the current seismometer are calculated by using a frequency calibration equation;

A5. based on the parameters $g'_p$ $g'_i$ $g'_d$, the feedback coil is reused as a signal generator and obtain a frequency band of current signal;

A6. according to a difference between a current signal frequency band and a standard frequency band, a frequency band drift value of the current seismometer is obtained;

A7. based on the frequency band drift value, the feedback parameters $g_p$, $g_i$ and $g_d$ of the seismometer are obtained through inverse inference based on interpolation results.

Further, an expression of the difference response curve is as follows:

$$F'=F_o-F_i$$

wherein, F' represents the difference response curve, $F_o$ represents a frequency characteristic spectrum of the collected signal, and $F_o$ represents a frequency characteristic spectrum of the vibration excitation signal.

Further, an expression of the frequency calibration equation is as follows:

$$\begin{cases} g_p = \dfrac{-\gamma\delta(t)F'(t)}{1+a_1} \\ g_i = \dfrac{-\gamma\delta(t)\int_0^t F'(\tau)d\tau}{1+a_2} \\ g_d = \dfrac{-\gamma\delta(t)\dfrac{dF'}{dt}}{1+a_3} \\ \delta(t) = -(s+a_i)F'(t) \end{cases}$$

wherein, $g_p$, $g_i$ and $g_d$ respectively represent the feedback parameters, s, $a_i$, $\gamma$, $a_1$, $a_2$, $a_3$ respectively represent self-adaption gain coefficients, $\delta(t)$ represents gain time function, F'(t) and F' both represent frequency difference response, t represents time, F'($\tau$) represents frequency domain difference response, and d represents integration.

Further, an expression of the feedback parameters is as follows:

$$\begin{cases} m(\ddot{x}+\ddot{w}) + kx + \dot{c}x + G_sI_s + G_aI_a = 0 \\ V_0 = RI_s \\ I_a = H(s)V_0 = \left(g_p + \dfrac{g_i}{s} + sg_d\right)V_0 \end{cases}$$

wherein, $g_p$, $g_i$ and $g_d$ represent feedback parameters, m represents a mass of the mass block, $\ddot{x}$ represents a second derivative of a mass block position, $\ddot{w}$ represents a second derivative of surface displacement, k represents a spring coefficient, x represents the mass block position, c represents damping amount of a damper, $\dot{x}$ represents a derivative of the mass block position, $G_s$ represents an induction coil that senses displacement of the mass block, $I_s$ represents induced current generated by the seismometer due to vibration displacement, $G_a$ represents the feedback coil that is offset in a vertical direction, $I_a$ represents the feedback current generated by the PID feedback circuit, $V_0$ represents a voltage value output by the seismometer, R represents resistance, H(s) represents the PID feedback circuit, and s represents the Laplace variable.

Further, an electromechanical equation of a velocity seismometer in the seismometer after the all-dip broadband seismometer method based on dip angle perception is:

$$\begin{cases} m\ddot{x} + c(\dot{x}-\dot{w}) + k(x-w) + G_sI_s + G_aI_a + G_bI_b = 0 \\ G_bI_b = mg\sin\theta \\ G_aI_a = \left(g_p + \dfrac{g_i}{s} + sg_d\right)V_0 + mg\cos\theta \end{cases}$$

wherein, m represents the mass of the mass block, $\ddot{x}$ represents the second derivative of the mass block position, $\ddot{w}$ represents the second derivative of the surface displacement, k represents the spring coefficient, c represents the damping amount of the damper, x represents the mass block position, w represents the surface displacement, $G_s$ represents the induction coil that senses the mass block displacement, $I_s$ represents the induced current generated by the seismometer due to the vibration displacement, $G_a$ represents the feedback coil that is offset in the vertical direction, $I_a$ represents the feedback current generated by the PID feedback circuit, $G_b$ represents the feedback coil of horizontal direction cancellation, $I_b$ represents the feedback current generated by the PID feedback circuit, g represents gravitational acceleration, $\theta$ represents an inclination angle of the current seismometer, and $g_p$, $g_i$ and $g_d$ represent the feedback parameters, and $V_0$ represents the voltage value output by the seismometer.

The advantageous effects of the present disclosure:

(1) After the design phase of traditional feedback seismic sensors is completed, the feedback circuit will be statically solidified inside the sensor. When factors such as equipment aging and temperature changes in the working environment cause feedback parameter drift, traditional force feedback seismic sensors cannot dynamically adapt to maintain their rated performance indicators. The present disclosure effectively solves the problems existing in traditional seismometers by providing the first force feedback module, the second force feedback module, and the third force feedback module, utilizing a dynamic force balance feedback method and an all-dip broadband seismic detection method based on dip angle perception.

(2) In order to meet the current monitoring requirements for unconventional and triggered earthquakes, seismometers usually need to be deployed in various complex surface environment areas. Therefore, in order to reduce the construction difficulty, seismometers must be able to adapt to various non-horizontal deployment environments. Existing commercial equipment usually can only achieve a distortion rate of 0.3% within a 15 degree inclination angle, and cannot cope with more inclined environmental conditions. The present disclosure can achieve an advanced seismometer device with a distortion rate of 0.3 at an all-dip angle (within 360 degrees) through the second feedback force module and the third feedback module.

Figure 1:
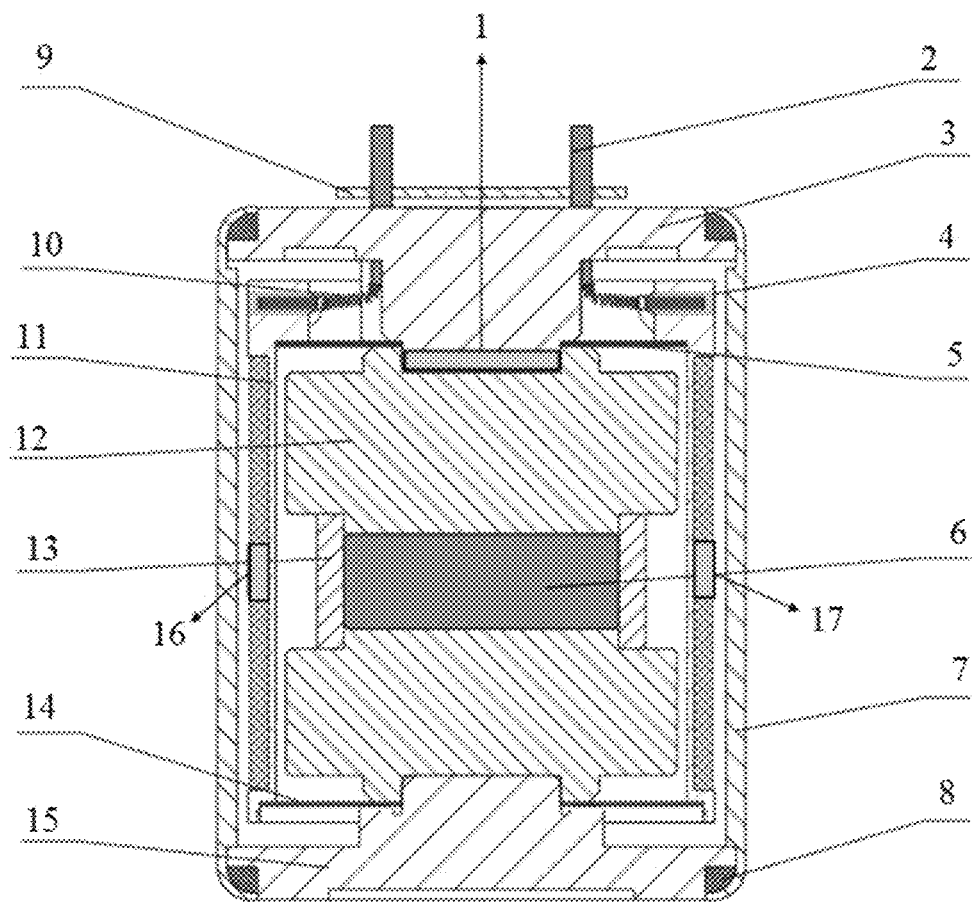
FIG. 1 is a structural schematic diagram of the present disclosure.

Wherein, the reference of numbers in the drawings are shown as follows: 1—first force feedback module, 2—insulator, 3—top cover, 4—terminal post, 5—upper leaf spring, 6—mass block, 7—casing, 8—sealing ring, 9—insulation gasket, 10—guide spring, 11—wire frame, 12—magnetic shoe, 13—compensation ring, 14—lower leaf spring, 15—bottom cover, 16—second force feedback module, 17—third force feedback module.

DETAILED DESCRIPTION OF THE EMBODIMENTS

The specific embodiments of the present disclosure are described below to facilitate the understanding of the present disclosure by those skilled in the art. However, it should be clear that the present disclosure is not limited to the scope of the specific embodiments. For ordinary skilled person in the art, as long as various changes are within the spirit and scope of the present disclosure as defined and determined by the attached claims. These changes are obvious, and all disclosures and creations that utilize the concept of this disclosure are under protection.

Embodiment

As shown in FIG. 1, a seismometer with high sensitivity, broadband and all-dip is provided, including a first force feedback module 1, an insulator 2, a top cover 3, a terminal post 4, an upper leaf spring 5, a mass block 6, a casing 7, a sealing ring 8, an insulation gasket 9, a guide spring 10, a wire frame 11, a magnetic shoe 12, a compensation ring 13, a lower leaf spring 14, a bottom cover 15, a second force feedback module 16 and a third force feedback module 17.

The first force feedback module 1 is fixed on the magnetic shoe 12, the second force feedback module 16 and the third force feedback module 17 are both fixed in a middle of the wire frame 11, the top cover 3 is tightly pressed on the upper leaf spring 5 and the magnetic shoe 12, the magnetic shoe 12 is tightly pressed on the lower leaf spring 14 and the bottom cover 15, the terminal post 4 is elastically connected to the guide spring 10, the insulator 2 is connected to the casing 7, the mass block 6 is respectively adjacent to the magnetic shoe 12 and the compensation ring 13 and is located in the middle of the seismometer, the sealing ring 8 is adjacent to the upper leaf spring 5 and is located at the bottom of the seismometer, the insulation gasket 9 is located at the top of the seismometer, and the compensation ring 13 is adjacent to the magnetic shoe 12.

Figure 2:
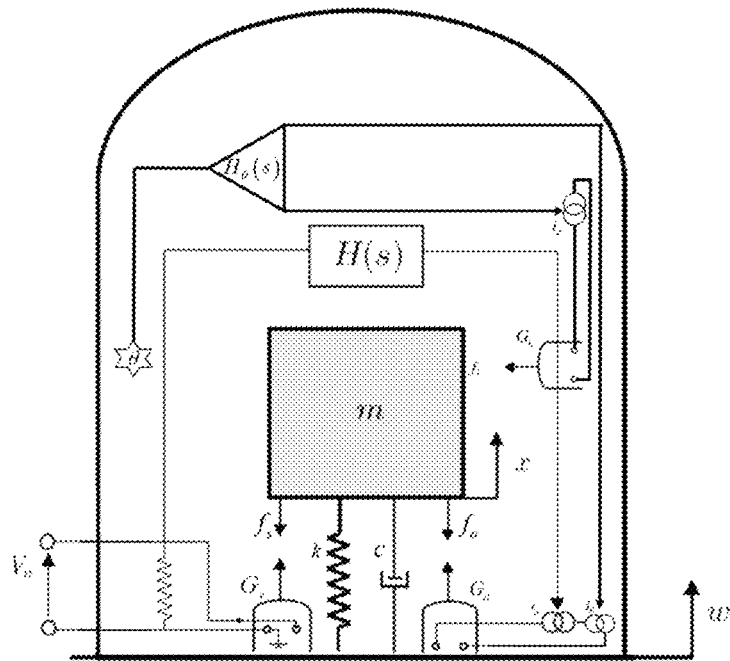
FIG. 2 is a circuit structure diagram of the seismometer in this embodiment.
Figure 3:
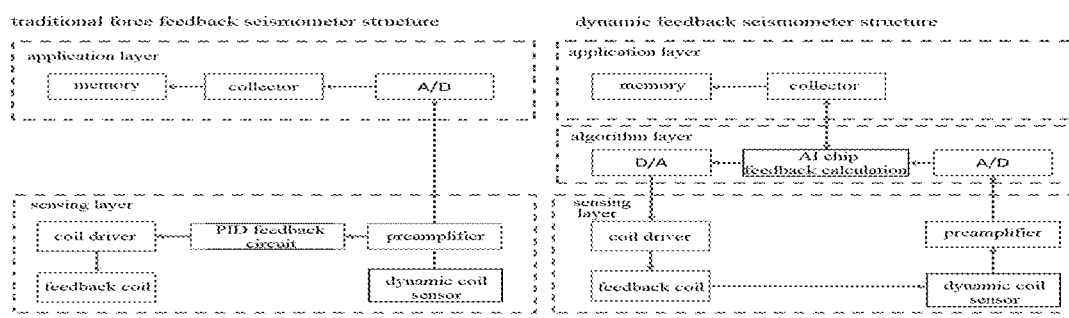
FIG. 3 shows the comparison between the traditional force feedback seismometer and the dynamic force feedback seismometer in this embodiment.

In the present embodiment, as show in FIG. 2 and FIG. 3, each of the first force feedback module 1, the second force feedback module 16 and the third force feedback module 17 includes a first control sub module and a second control sub module; the first control sub module includes a coil and a PID feedback circuit; the second control sub module includes an application layer, an algorithm layer connected to the application layer, and a sensing layer connected to the algorithm layer.

The application layer is configured to obtain dynamic orientation and obtain perception of low-frequency signals based on the dynamic orientation.

The algorithm layer is configured to calculate feedback parameters of the seismometer based on the first force feedback module 1 by using a broadband seismometer method based on dynamic force balance feedback, and to cancel interference of gravity components based on the first force feedback module 1, the second force feedback module 16 and the third force feedback module 17 by using an all-dip broadband seismometer method based on dip angle perception, and feedback angle and attitude information of current seismometer.

The sensing layer is configured to influence a motion of the mass block 6 based on a generated feedback force to obtain a sensing perception result.

The PID feedback circuit is configured to generate feedback current according to the feedback parameters of the seismometer, and generate feedback force based on the coil.

In the present embodiment, as show in FIG. 3, the application layer includes a memory and a collector connected with the memory.

The algorithm layer includes a feedback calculation unit connected to the collector, a D/A converter and a D/A converter respectively connected to the feedback calculation unit.

The sensing layer includes a coil driver connected to the D/A converter, a feedback coil connected to the coil driver, a dynamic coil sensor connected to the feedback coil, a preamplifier connected to the dynamic coil sensor, and the preamplifier is connected to the A/D converter.

In the present embodiment, the feedback calculation unit includes:

a parameter estimator, configured to calculate frequency characteristic response of a collected signal and an excitation signal, extract a difference response curve;

a controller parameter calculation sub unit, configured to dynamically adjust calibration parameters of the current seismometer according to a calculated frequency characteristic response curve; and a controller, configured to adjust acquisition frequency according to controller parameters to achieve real-time dynamic calibration of the seismometer.

In the present embodiment, a calculation process of the feedback parameters of the seismometer is as follows:

A1. the coil driver is used to receive analog signals from the D/A converter, and the feedback coil is controlled through the analog signals to excite a specific frequency vibration signal;

A2. the vibration signal is transmitted to the feedback calculation unit through the dynamic coil sensor, the preamplifier, and the A/D converter in sequence;

A3. the frequency characteristic response of the collected signal and the excited vibration signal is calculated by the feedback calculation unit to extract the difference response curve;

A4. according to the difference response curve, parameters $g'_p$ $g'_i$ $g'_d$ of the current seismometer are calculated by using a frequency calibration equation;

A5. based on the parameters $g'_p$ $g'_i$ $g'_d$, the feedback coil is reused as a signal generator and obtain a frequency band of current signal;

A6. according to a difference between a current signal frequency band and a standard frequency band, a frequency band drift value of the current seismometer is obtained;

A7. based on the frequency band drift value, the feedback parameters $g_p$, $g_i$ and $g_d$ of the seismometer are obtained through inverse inference based on interpolation results.

In this embodiment, the second force feedback module 16 and the third force feedback module 17 both include a coil and a PID feedback circuit.

The first force feedback module 1, the second force feedback module 16, and the third force feedback module 17 are all used to generate feedback forces that affect the motion of mass block 6 and affect the sensing perception results by using the all-dip broadband seismic detection method based on dip angle perception.

In this embodiment, as shown in FIG. 3, the disclosure provides an algorithm calculation layer outside the sensing layer and the application layer, and the seismometer uses FPGA calculation unit or AI calculation unit to realize real-time feedback parameter calculation. The force balance feedback parameters to be calculated are the three coefficients $g_p$ $g_i$ $g_d$ in equation (1). Formula (1) is the electro-mechanical equation expression in the circuit structure of FIG. 4:

$$\begin{cases} m(\ddot{x}+\ddot{w}) + kx + c\dot{x} + G_sI_s + G_aI_a = 0 \\ V_0 = RI_s \\ I_a = H(s)V_0 = \left(g_p + \dfrac{g_i}{s} + sg_d\right)V_0 \end{cases} \quad (1)$$

Wherein, m represents the mass of the mass block, $\ddot{x}$ represents the second derivative of the mass block position, $\ddot{w}$ represents the second derivative of surface displacement, k represents the spring coefficient, x represents the mass block position, c represents the damping amount of the damper, $\dot{x}$ represents the derivative of the mass block position, $G_s$ represents an induction coil that senses displacement of the mass block, $I_s$ represents the induced current generated by the seismometer due to vibration displacement, $G_a$ represents the feedback coil that is offset in the vertical direction, $I_a$ represents the PID feedback current generated by the PID feedback circuit, $V_0$ represents the voltage value output by the seismometer, R represents resistance, H(s) represents the PID feedback circuit, and s represents the Laplace variable.

In this embodiment, the broadband seismometer technology based on dynamic force balance feedback: the dynamic force balance feedback needs to determine three control parameters $g_p$ $g_i$ $g_d$, and the traditional method is to estimate these three parameters by measuring the feedback value of the standard vibration on the shaking table through the standard vibration test. Dynamic force balance feedback requires that the seismometer can determine the control parameter values according to the measured signals when it has been deployed in the field.

The calculation process for determining the parameters of the seismometer consists of a broadband seismometer frequency self-identification algorithm and a dynamic force balance generation algorithm:

(1) A PID controller (Proportional Integral Differential Controller) consists of a proportional unit, an integral unit, and a derivative unit. For the force feedback control system, the output characteristics of the system are adjusted by adjusting the gains of $g_p$ $g_i$ $g_d$ these three units.

Figure 4:
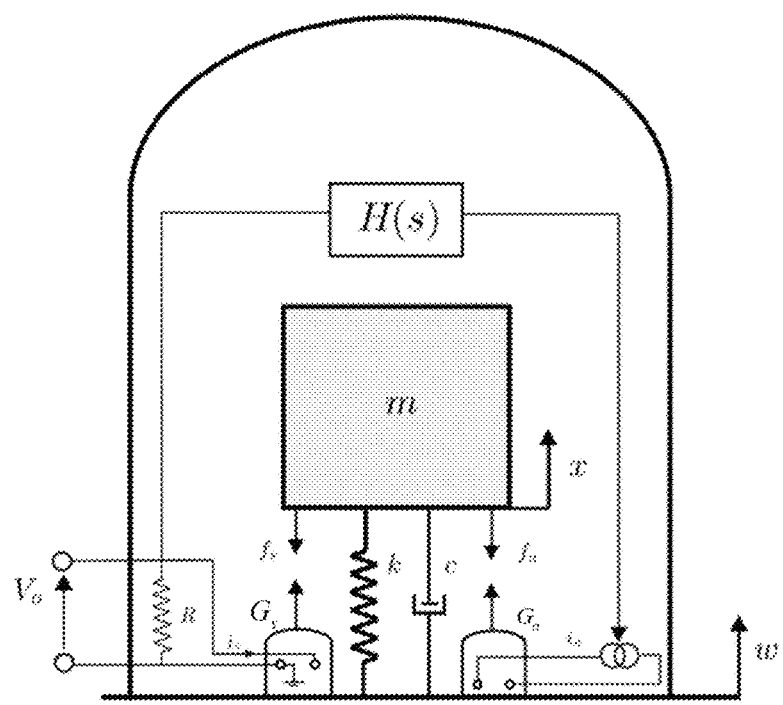
FIG. 4 is a circuit structure diagram of conventional force balance feedback seismometer.
Figure 5:
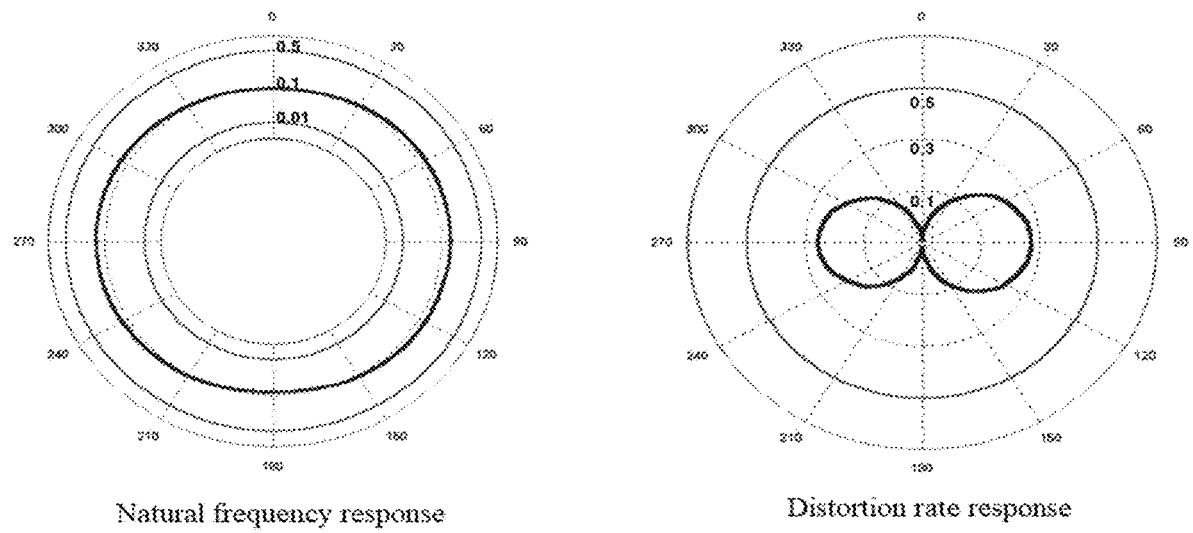
FIG. 5 is a schematic diagram of the first-order modal analysis of the all-dip broadband seismometer at different angles in this embodiment.

(2) The conventional PID control and the dynamic control of the present disclosure are shown in FIG. 4 and FIG. 5. In FIG. 5, the natural response frequency does not decay with angle, and the distortion rate can achieve a distortion rate of 0.1% at plus or minus 30 degrees, and a distortion rate of 0.3% at a plus or minus 180 degrees inclination angle. Compared to conventional control systems, the present disclosure adopts a self-adaption control method, which can recognize changes in environmental conditions and automatically correct control actions to achieve the optimal control effect of the system. Specifically, the specific operations of the present disclosure are as follows:

a. Regularly trigger and receive controllable data, which is controlled by the coil driver in FIG. 3 to trigger a specific frequency vibration signal through the feedback coil.

b. The vibration signal is transmitted to the AI chip feedback calculation module through the dynamic coil sensor, the preamplifier, and the A/D (data acquisition). This module consists of three parts: a parameter estimator, a controller parameter calculation, and a controller. The parameter estimator continuously identifies the model structure and parameters of the system based on the measured system inputs and outputs; the controller parameter calculation continuously changes the control effect based on the changes in the model, ultimately achieving satisfactory control results.

c. The parameter estimator calculates the frequency characteristic response of the collected signal and the excitation signal through an AI chip, and obtains the difference response curve F'=$F_o$-$F_i$, $F_o$ represents the frequency characteristic spectrum of the collected signal, and $F_o$ represents the frequency characteristic spectrum of the vibration excitation signal.

e. After obtaining the difference response curve, the AI chip is calculated using the frequency calibration equation:

$$\begin{cases} g_p = \dfrac{-\gamma\delta(t)F'(t)}{1+a_1} \\ g_i = \dfrac{-\gamma\delta(t)\displaystyle\int_0^t F'(\tau)d\tau}{1+a_2} \\ g_d = \dfrac{-\gamma\delta(t)\dfrac{dF'}{dt}}{1+a_3} \\ \delta(t) = -(s+a_i)F'(t) \end{cases} \quad (2)$$

Wherein, $g_p$, $g_i$ and $g_d$ respectively represent the feedback parameters, s, $a_i$, $\gamma$, $a_1$, $a_2$, $a_3$ respectively represent self-adaption gain coefficients, $\delta(t)$ represents gain time function, F'(t) and F' both represent frequency difference response, t represents time, F'($\tau$) represents frequency domain difference response, and d represents integration. By using the above formula, new parameters $g'_p$ $g'_i$ $g'_d$ suitable for the current device can be calculated.

(3) The broadband seismometer frequency self-identification algorithm uses the feedback coil ($G_a$ in FIG. 4) as a signal generator. Before the equipment leaves the factory, use measuring equipment to measure and record the frequency characteristics of the standard current signal generated by the feedback coil. During the use of the equipment, the generated signal can be used to measure and calculate the current signal frequency band through FPGA chips and AI chips without external devices.

(4) According to the difference between the measured frequency band and the standard frequency band, the frequency band drift value of the current equipment due to equipment aging and other reasons can be obtained. At this time, the dynamic feedback network generation algorithm calculates the three appropriate control parameters $g_p$, $g_i$, $g_d$ corresponding to the current equipment based on the interpolation results, that is, it can realize the feedback network that can automatically adapt to the current seismometer state, and balance the environmental impact in real time, so as to adjust the working frequency band of the seismometer to the expected value and adjust the damping coefficient to the optimal damping value.

Figure 6:
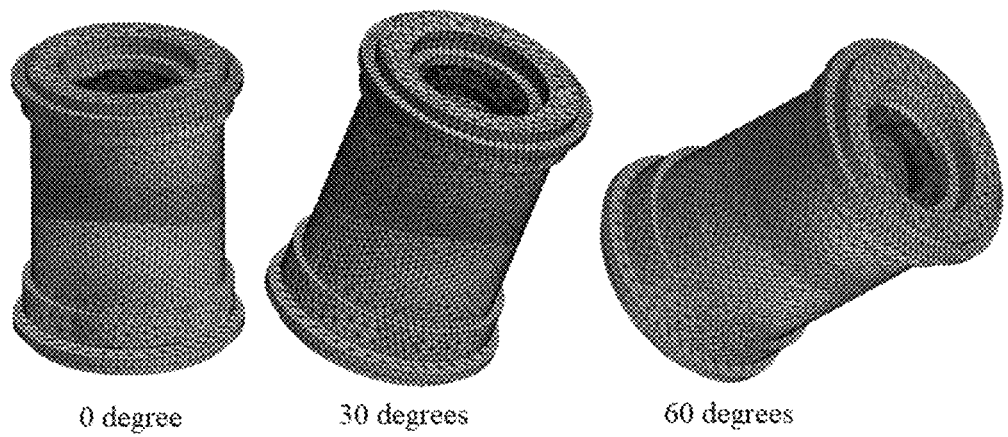
FIG. 6 is a schematic diagram of the frequency response properties and distortion rate response properties of the all-dip seismometer at different angles in this embodiment.

In this embodiment, the all-dip broadband seismometer technology based on dip angle perception: as the dip angle of the traditional velocity seismometer increases, the interference term caused by gravity gradually increases, thereby polluting the detection band with noise pollution, increasing the distortion rate and decreasing the sensitivity. In response to this issue, the present disclosure introduces an attitude angle sensor and designs an electronic method based on dynamic feedback self-adaption cancellation of the interference of gravity components in measurement. The inclination sensor will sense the most accurate current device angle and attitude in real-time, and feedback the attitude information to the dynamic feedback calculation system. The circuit structure after using this technology is shown in FIG. 2. A group of feedback coils (FIG. 2, Gb) and a group of angle detection circuits (FIG. 2, θ represents the current dip angle of the seismometer) are added to the structure of the conventional dynamic coil sensor. After adopting the force balance feedback technology, the electromechanical equation of the velocity seismometer becomes Formula (3), wherein, Gb is the feedback coil of horizontal offset and Ga is the feedback coil of vertical offset. Under the action of the angle perceptron and the feedback force, the interference force term caused by gravity is reduced by more than one order of magnitude, thus reducing its interference to the equivalent natural frequency and reducing its influence on distortion, thereby significantly improving the linearity of the transfer function, achieving a reduction in device acquisition distortion, and improving the ability of the seismometer to detect signals from different angles. At the same time, since the all-dip broadband velocity seismometer technology involves coordination and coupling of multiple parameters, the disclosure will use finite element simulation to determine the optimal spring structure and overall seismometer structure parameters, as shown in FIG. 6, the results show that the disclosure is significantly better than the distortion rate and natural frequency response of conventional seismometers at different angles. In FIG. 6, 0 degree is the error displacement caused by non-dip at the bottom, the bottom error displacement at 30 degrees begins to appear, and the bottom error displacement significantly increases at 60 degrees. The bottom error displacement refers to the physical interference of the inclination angle on the equipment measurement.

The disclosure adopts a moving coil seismometer. When collecting and exploring seismic waves, the moving coil seismometer is vertically inserted into the ground, and the seismometer can be well coupled with the ground. When the ground vibrates, the casing of the moving coil seismometer will vibrate with the ground. At this time, the vibration system inside the seismometer will play a role. Due to the existence of the leaf spring inside the seismometer, the inertial sensor inside the seismometer has a relative motion with the casing of the seismometer, because of its tendency to remain stationary. When the relative motion between the coil and the permanent magnet inside the seismometer occurs, the magnetic circuit system in the moving coil seismometer will work. According to the electromagnetic induction principle, when the coil and the permanent magnet in the seismometer generate relative motion, the magnetic flux through the coil will change, and then the induced electromotive force will be generated in the coil. The induced electromotive force generated by vibration will be transmitted to the back-end data acquisition system through the two electrodes of the moving coil seismometer. It can be simply considered that the more intense the vibration is, the greater the voltage output by the seismometer will be. In this way, the moving coil seismometer plays the role of converting seismic wave.

What is claimed is:

1. A seismometer with high sensitivity, broadband and all-dip, comprising a first force feedback module (1), an insulator (2), a top cover (3), a terminal post (4), an upper leaf spring (5), a mass block (6), a casing (7), a sealing ring (8), an insulation gasket (9), a guide spring (10), a wire frame (11), a magnetic shoe (12), a compensation ring (13), a lower leaf spring (14), a bottom cover (15), a second force feedback module (16) and a third force feedback module (17);

wherein the first force feedback module (1) is fixed on the magnetic shoe (12), the second force feedback module (16) and the third force feedback module (17) are both fixed in a middle of the wire frame (11), the top cover (3) is tightly pressed on the upper leaf spring (5) and the magnetic shoe (12), the magnetic shoe (12) is tightly pressed on the lower leaf spring (14) and the bottom cover (15), the terminal post (4) is elastically connected to the guide spring (10), the insulator (2) is connected to the casing (7), the mass block (6) is respectively adjacent to the magnetic shoe (12) and the compensation ring (13) and is located in a middle of the seismometer, the sealing ring (8) is adjacent to the upper leaf spring (5) and is located at a bottom of the seismometer, the insulation gasket (9) is located at a top of the seismometer, and the compensation ring (13) is adjacent to the magnetic shoe (12).

2. The seismometer with high sensitivity, broadband and all-dip according to claim 1, wherein each of the first force feedback module (1), the second force feedback module (16) and the third force feedback module (17) comprises a first control sub module and a second control sub module; the first control sub module comprises a coil and a PID feedback circuit; the second control sub module comprises an application layer, an algorithm layer connected to the application layer, and a sensing layer connected to the algorithm layer;

the application layer is configured to obtain dynamic orientation and obtain perception of low-frequency signals based on the dynamic orientation;

the algorithm layer is configured to calculate feedback parameters of the seismometer based on the first force feedback module (1) by using a broadband seismometer method based on dynamic force balance feedback, and to cancel interference of gravity components based on the first force feedback module (1), the second force feedback module (16) and the third force feedback module (17) by using an all-dip broadband seismometer method based on dip angle perception, and feedback angle and attitude information of current seismometer;

the sensing layer is configured to influence a motion of the mass block (6) based on a generated feedback force to obtain a sensing perception result; and the PID feedback circuit is configured to generate feedback current according to the feedback parameters of the seismometer, and generate feedback force based on the coil.

3. The seismometer with high sensitivity, broadband and all-dip according to claim 2, wherein the application layer comprises a memory and a collector connected with the memory;

the algorithm layer comprises a feedback calculation unit connected to the collector, a D/A converter and a D/A converter respectively connected to the feedback calculation unit; and the sensing layer comprises a coil driver connected to the D/A converter, a feedback coil connected to the coil driver, a dynamic coil sensor connected to the feedback coil, and a preamplifier connected to the dynamic coil sensor; and the preamplifier is connected to the A/D converter.

4. The seismometer with high sensitivity, broadband and all-dip according to claim 3, wherein the feedback calculation unit comprises:

a parameter estimator, configured to calculate frequency characteristic response of a collected signal and an excitation signal, extract a difference response curve;

a controller parameter calculation sub unit, configured to dynamically adjust calibration parameters of the current seismometer according to a calculated frequency characteristic response curve; and a controller, configured to adjust acquisition frequency according to controller parameters to achieve real-time dynamic calibration of the seismometer.

5. The seismometer with high sensitivity, broadband and all-dip according to claim 4, wherein a calculation process of the feedback parameters of the seismometer is as follows:

A1. the coil driver is used to receive analog signals from the D/A converter, and the feedback coil is controlled through the analog signals to excite a specific frequency vibration signal;

A2. the vibration signal is transmitted to the feedback calculation unit through the dynamic coil sensor, the preamplifier, and the A/D converter in sequence;

A3. the frequency characteristic response of the collected signal and the excited vibration signal is calculated by the feedback calculation unit to extract the difference response curve;

A4. according to the difference response curve, parameters $g'_p$, $g'_i$, $g'_p$ of the current seismometer are calculated by using a frequency calibration equation;

A5. based on the parameters $g'_p$, $g'_i$, $g'_p$, the feedback coil is reused as a signal generator and obtain a frequency band of current signal;

A6. according to a difference between a current signal frequency band and a standard frequency band, a frequency band drift value of the current seismometer is obtained;

A7. based on the frequency band drift value, the feedback parameters $g_p$, $g_i$ and $g_d$ of the seismometer are obtained through inverse inference based on interpolation results.

6. The seismometer with high sensitivity, broadband and all-dip according to claim 5, wherein an expression of the difference response curve is as follows:

$$F'=F_o-F_i$$

wherein, F' represents the difference response curve, $F_o$ represents a frequency characteristic spectrum of the collected signal, and $F_o$ represents a frequency characteristic spectrum of the vibration excitation signal.

7. The seismometer with high sensitivity, broadband and all-dip according to claim 6, wherein an expression of the frequency calibration equation is as follows:

$$\begin{cases} g_p = \dfrac{-\gamma\delta(t)F'(t)}{1+a_1} \\ g_i = \dfrac{-\gamma\delta(t)\int_0^t F'(\tau)d\tau}{1+a_2} \\ g_d = \dfrac{-\gamma\delta(t)\dfrac{dF'}{dt}}{1+a_3} \\ \delta(t) = -(s+a_i)F'(t) \end{cases}$$

wherein, $g_p$, $g_i$ and $g_d$ respectively represent the feedback parameters, s, $a_i$, $\gamma$, $a_1$, $a_2$, $a_3$ respectively represent self-adaption gain coefficients, $\delta(t)$ represents gain time function, F'(t) and F' both represent frequency difference response, t represents time, F'($\tau$) represents frequency domain difference response, and d represents integration.

8. The seismometer with high sensitivity, broadband and all-dip according to claim 7, wherein an expression of the feedback parameters is as follows:

$$\begin{cases} m(\ddot{x}+\ddot{w})+kx+\dot{c}x+G_sI_s+G_aI_a=0 \\ V_0=RI_s \\ I_a=H(s)V_0=\left(g_p+\dfrac{g_i}{s}+sg_d\right)V_0 \end{cases}$$

wherein, $g_p$, $g_i$ and $g_d$ represent feedback parameters, m represents a mass of the mass block, $\ddot{x}$ represents a second derivative of a mass block position, $\ddot{w}$ represents a second derivative of surface displacement, k represents a spring coefficient, x represents the mass block position, c represents damping amount of a damper, $\dot{x}$ represents a derivative of the mass block position, $G_s$ represents an induction coil that senses displacement of the mass block, $I_s$ represents induced current generated by the seismometer due to vibration displacement, $G_a$ represents the feedback coil that is offset in a vertical direction, $I_a$ represents the feedback current generated by the PID feedback circuit, $V_0$ represents a voltage value output by the seismometer, R represents resistance, H(s) represents the PID feedback circuit, and s represents the Laplace variable.

9. The seismometer with high sensitivity, broadband and all-dip according to claim 8, wherein an electromechanical equation of a velocity seismometer in the seismometer after the all-dip broadband seismometer method based on dip angle perception is:

$$\begin{cases} m\ddot{x}+c(\dot{x}-\dot{w})+k(x-w)+G_sI_s+G_aI_a+G_bI_b=0 \\ G_bI_b=\text{mg}\sin\theta \\ G_aI_a=\left(g_p+\dfrac{g_i}{s}+sg_d\right)V_0+\text{mg}\cos\theta \end{cases}$$

wherein, m represents the mass of the mass block, $\ddot{x}$ represents the second derivative of the mass block position, $\ddot{w}$ represents the second derivative of the surface displacement, k represents the spring coefficient, c represents the damping amount of the damper, x represents the mass block position, w represents the surface displacement, $G_s$ represents the induction coil that senses the mass block displacement, $I_s$ represents the induced current generated by the seismometer due to the vibration displacement, $G_a$ represents the feedback coil that is offset in the vertical direction, $I_a$ represents the feedback current generated by the PID feedback circuit, $G_b$ represents the feedback coil of horizontal direction cancellation, $I_b$ represents the feedback current generated by the PID feedback circuit, g represents gravitational acceleration, θ represents an inclination angle of the current seismometer, and $g_p$, $g_i$ and $g_d$ represent the feedback parameters, and $V_0$ represents the voltage value output by the seismometer.

* * * * *